United States Patent
Rodriguez

(10) Patent No.: US 10,280,041 B2
(45) Date of Patent: May 7, 2019

(54) SELF-PROPELLED ELEVATOR SYSTEM HAVING WINDINGS PROPORTIONAL TO CAR VELOCITY

(71) Applicant: OTIS ELEVATOR COMPANY, Farmington, CT (US)

(72) Inventor: Fernando Rodriguez, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 491 days.

(21) Appl. No.: 14/897,106

(22) PCT Filed: Jun. 27, 2013

(86) PCT No.: PCT/US2013/048054
§ 371 (c)(1),
(2) Date: Dec. 9, 2015

(87) PCT Pub. No.: WO2014/209309
PCT Pub. Date: Dec. 31, 2014

(65) Prior Publication Data
US 2016/0137459 A1    May 19, 2016

(51) Int. Cl.
   B66B 1/06     (2006.01)
   B66B 11/04    (2006.01)
   H02K 41/03    (2006.01)

(52) U.S. Cl.
   CPC ........ *B66B 11/0407* (2013.01); *H02K 41/031* (2013.01)

(58) Field of Classification Search
   CPC ..... B66B 5/0018; B66B 1/3492; B66B 7/062; B66B 9/00; B66B 11/0407; H02K 41/031

USPC ....... 187/247, 250, 251, 258, 289, 293, 391, 187/393; 318/135; 310/12.01, 12.04, 310/12.09, 12.11
   See application file for complete search history.

(56) References Cited

U.S. PATENT DOCUMENTS

| | | | | |
|---|---|---|---|---|
| 4,825,111 A | * | 4/1989 | Hommes | B60L 15/005 104/290 |
| 4,849,664 A | * | 7/1989 | Miyazaki | B60L 15/005 104/290 |
| 5,086,881 A | * | 2/1992 | Gagnon | B66B 17/12 104/290 |

(Continued)

FOREIGN PATENT DOCUMENTS

| | | |
|---|---|---|
| CN | 1061383 A | 5/1992 |
| DE | 4115728 A | 11/1991 |

(Continued)

OTHER PUBLICATIONS

Translation JP 2001-145326 A.*

(Continued)

*Primary Examiner* — Anthony Salata
(74) *Attorney, Agent, or Firm* — Cantor Colburn LLP

(57) ABSTRACT

An elevator system includes a hoistway and an elevator car to travel in the hoistway. Permanent magnets are mounted to the elevator car and primary windings are mounted in the hoistway to form a linear motor. The primary windings having a first section having a first number of turns and a second section having a second number of turns. The first number of turns is less than the second number of turns.

7 Claims, 3 Drawing Sheets

(56) References Cited

U.S. PATENT DOCUMENTS

| | | | | |
|---|---|---|---|---|
| 5,212,416 | A | * | 5/1993 | Shimizu .................. B21B 39/14 |
| | | | | 310/12.21 |
| 5,235,226 | A | * | 8/1993 | Olsen ................... H02K 41/025 |
| | | | | 187/289 |
| 5,288,956 | A | | 2/1994 | Kadokura et al. |
| 5,483,111 | A | * | 1/1996 | Kuznetsov ............ B60L 15/005 |
| | | | | 104/292 |
| 5,497,038 | A | | 3/1996 | Sink |
| 5,666,883 | A | * | 9/1997 | Kuznetsov .............. B60L 13/04 |
| | | | | 104/281 |
| 5,751,076 | A | * | 5/1998 | Zhou ................... B66B 11/0407 |
| | | | | 187/250 |
| 5,841,250 | A | * | 11/1998 | Korenaga ........... G03F 7/70358 |
| | | | | 318/135 |
| 6,189,657 | B1 | * | 2/2001 | Jessenberger ....... B66B 11/0407 |
| | | | | 187/289 |
| 7,261,186 | B2 | * | 8/2007 | Deplazes ................ B60L 13/10 |
| | | | | 187/277 |
| 2003/0000778 | A1 | * | 1/2003 | Smith ....................... B66B 1/30 |
| | | | | 187/289 |
| 2004/0123766 | A1 | | 7/2004 | Van Den Bergh et al. |
| 2016/0083226 | A1 | * | 3/2016 | Piech .................. B66B 11/0407 |
| | | | | 187/250 |
| 2018/0005756 | A1 | * | 1/2018 | Fargo .................... H01F 41/125 |

FOREIGN PATENT DOCUMENTS

| | | | |
|---|---|---|---|
| DE | 4107529 | A1 | 9/1992 |
| GB | 2281664 | A | 3/1995 |
| JP | H0947009 | A | 2/1997 |
| JP | 2001145326 | A * | 5/2001 |
| JP | 2001294381 | A | 10/2001 |
| KR | 1020070114653 | A | 12/2007 |
| KR | 1020080018390 | A | 2/2008 |
| WO | 2004060710 | A1 | 7/2004 |
| WO | 2010054651 | A2 | 5/2010 |

OTHER PUBLICATIONS

European Search Report for application EP 13888321.0, dated Mar. 13, 2017, 8pgs.
International Search Report for application PCT/US2013/048054, dated Mar. 31, 2014, 5 pages.
Written Opinion for application PCT/US2013/048054, dated Mar. 31, 2014, 5 pages.
Chinese First Office Action and Search for application CN 201380077669.4, dated Feb. 27, 2017, 10 pages.

* cited by examiner

SELF-PROPELLED ELEVATOR SYSTEM HAVING WINDINGS PROPORTIONAL TO CAR VELOCITY

FIELD OF INVENTION

The subject matter disclosed herein relates generally to the field of elevator systems, and more particularly, to a self-propelled elevator system having windings proportional to car velocity.

BACKGROUND

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway.

SUMMARY

According to an exemplary embodiment, an elevator system includes a hoistway; an elevator car to travel in the hoistway; permanent magnets mounted to the elevator car; and primary windings mounted in the hoistway, the primary windings having a first section having a first number of turns and a second section having a second number of turns, wherein the first number of turns is less than the second number of turns.

According to another exemplary embodiment, an elevator system includes a hoistway; an elevator car to travel in the hoistway; permanent magnets mounted to the elevator car; and primary windings mounted in the hoistway, the primary windings having a plurality of sections; wherein a coil current in each section is proportional to elevator car velocity in a respective section and a number of turns in each section is inversely proportional to elevator car velocity in the respective section.

According to yet another exemplary embodiment, a method for establishing primary windings in a self-propelled elevator system includes determining a first section of the primary windings where the elevator car travels at a first velocity; assigning a first number of turns and a first coil current to the first section; determining a second section of the primary windings where the elevator car travels at a second velocity, the second velocity lower than the first velocity; and assigning a second number of turns and a second coil current to the second section, wherein the second number of turns is greater than the first number of turns and the first coil current is greater than the second coil current.

According to yet another exemplary embodiment, a propulsion system includes a traveling component; permanent magnets mounted to the traveling component; and primary windings to impart force to the traveling component, the primary windings having a plurality of sections; wherein a coil current in each section is proportional to traveling component velocity in a respective section and a number of turns in each section is inversely proportional to traveling component velocity in the respective section.

According to yet another exemplary embodiment, a propulsion system includes a stationary guide having a plurality of sections including at least a first section and a second section, the first section having a first winding comprising a first plurality of turns, the second section having a second winding comprising a second plurality of turns, and wherein the first plurality of turns comprises less turns than the second plurality of turns; a movable portion configured to move along the stationary guide, the movable portion comprising a plurality of permanent magnets; a power source to provide a first current to the first winding; and a second power source to provide a second current to the second winding; wherein a product of the first current and a number of turns in the first plurality of turns is substantially equal to a product of the second current and a number of turns in the second plurality of turns.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
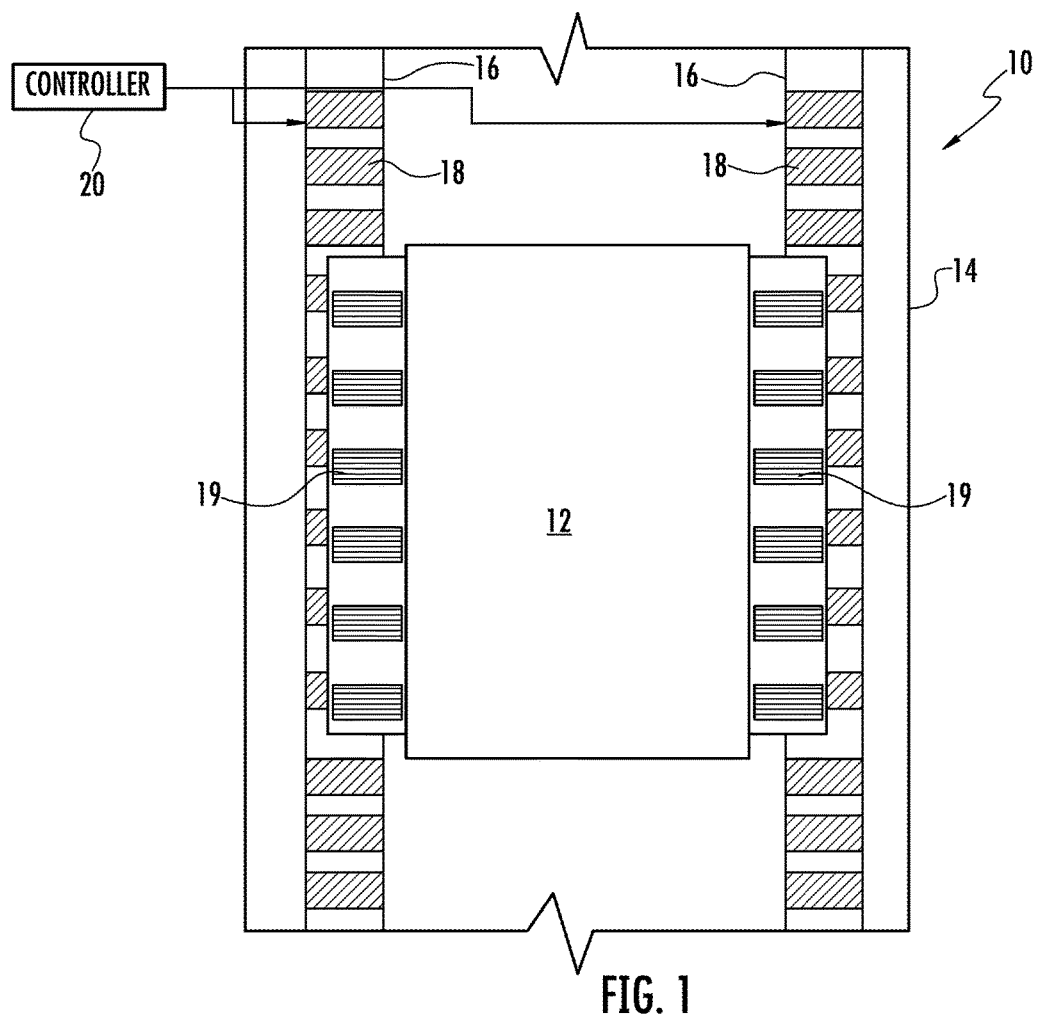
FIG. 1 depicts a self-propelled elevator car in an exemplary embodiment.

FIG. 1 depicts an elevator system 10 having a self-propelled elevator car 12. Elevator system 10 includes an elevator car 12 that travels in a hoistway 14. Elevator car 12 travels along one or more guide rails 16 extending along the length of hoistway 14. Elevator system 10 employs a linear motor having primary windings 18, which may be provided along guide rails 16 or located separate from guide rails 16. Primary windings 18 may be provided on one or more sides of elevator car 12. The primary windings 18 serve as stator windings of a permanent magnet synchronous motor to impart motion to elevator car 12. Primary windings 18 may be arranged in three phases, as is known in the linear motor art, or in other multiple-phase arrangements, such as, by way of non-limiting example, 4, 6, 9, or 12 phase arrangements. Permanent magnets 19 may be mounted to car 12, directly or indirectly, to serve as the secondary moving portion of the permanent magnet linear synchronous machine.

Controller 20 provides drive signals to the primary windings 18 to impart motion to the elevator car 12. Controller 20 may be implemented using a general-purpose microprocessor executing a computer program stored on a storage medium to perform the operations described herein. Alternatively, controller 20 may be implemented in hardware (e.g., DSP, ASIC, FPGA) or in a combination of hardware/software. Controller 20 may also be part of an elevator control system. Controller 20 may include power electronics (e.g., an inverter or drive) to power the primary windings 18.

The primary windings 18 are made up of coils, which may be arranged in a plurality of phases (e.g., 3 phases). The primary windings 18 may be divided into a plurality of sections, with at least some sections having a different number of turns and different coil current. The amp-turns in each section of the primary windings 18 is preferably substantially equal. The number of turns and coil current, however, may vary from one section to the next based on an expected velocity of car 12. In this way, sections of the primary windings 18 located where car velocity is expected to be low will use lower current. Using lower current reduces the expense of the power electronics used.

Figure 2:
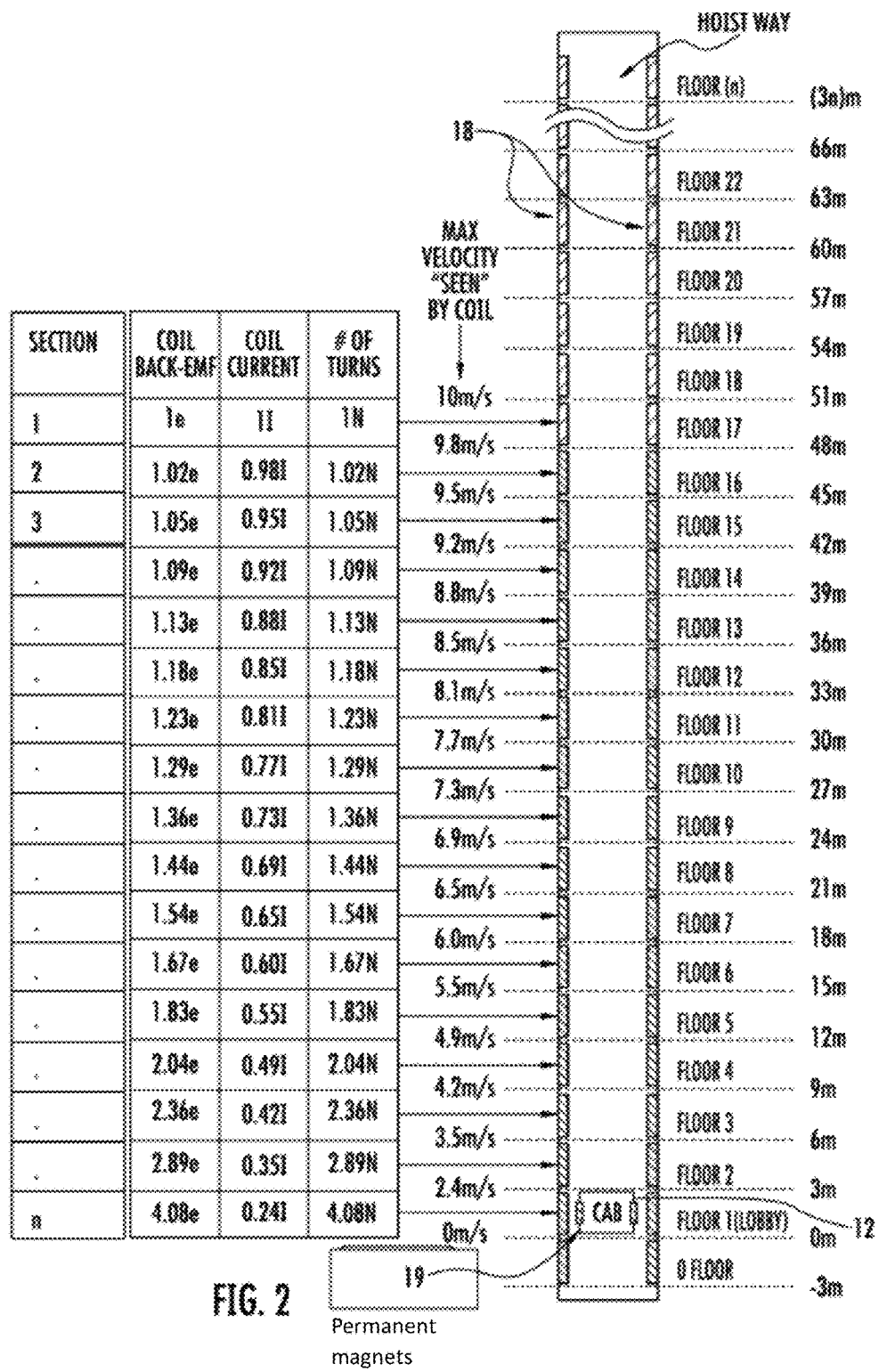
FIG. 2 depicts sections of primary windings in an exemplary embodiment.

FIG. 2 illustrates a self-propelled elevator system where the elevator car 12 is propelled by a linear machine including primary windings 18 and permanent magnets 19 on (or functionally coupled to) elevator car 12. The number of turns in the coils of the primary windings 18 is dependent upon the expected velocity of the car 12 in each section. In the example in FIG. 2, each section of the primary windings 18 corresponds to one floor. It is understood that the primary windings 18 may be grouped into other sections. For example, three floors may correspond to a section of the primary windings. In alternate embodiments, less than a floor may correspond to a section of the primary windings.

The expected car velocity may be based on certain assumptions. In an exemplary embodiment it is assumed that car 12 starts from rest on the 1st floor, the floor height equal 3 meters, each section of primary windings 18 equals 3 meters, the maximum car acceleration, A, equals 1 m/s$^2$ and the maximum car velocity, V, equals 10 m/s. From these assumptions, the instantaneous car velocity $v(t)=At$, the instantaneous cab vertical position $z(t)=0.5\ A(t)^2$ and car velocity as a function of vertical position $v(z)=(2\ zA)^{\wedge}(\frac{1}{2})$. The car velocity as a function of vertical position is used to calculate the maximum velocity that the car will reach as it passes the coils on its way up hoistway 14.

The maximum velocity of car 12 at each coil section is used to establish the number of turns of the coils and coil current in each section so as to control the size of the power electronics powering the coil section. FIG. 2 illustrates coil back emf, coil current, and number of turns for a plurality of sections of primary windings 18. The value N is defined as the number of turns per coil for a section that propels the car up to the maximum velocity (V=10 m/s). As shown in FIG. 2, car 12 is expected to travel past section 1 of primary windings 18 (e.g., floor 17) at the maximum velocity. For sections of the primary windings 18 where the car will not travel at the maximum velocity (e.g., sections 2-n), the number of turns of the coils of the primary windings 18 are increased, which serves to increase the back-emf and to decrease the coil current used. The coil current is inversely proportional to the number of turns per coils. The amp-turns (e.g., the coil current multiplied by the number of turns) is substantially constant from one section to the next.

FIG. 2 illustrates the bottom floors of hoistway 14. It is understood that other sections of hoistway 14 may experience reduced car velocities and similarly having primary winding sections with increased number of turns and reduced coil current as shown in FIG. 2. For example, car velocity is typically reduced at the top of hoistway 14. Further, intermediate transfer stations along hoistway 14 may also experience reduced car velocity. As such, primary winding sections with an increased number of turns and reduced coil current are not limited to the bottom portion of hoistway 14.

Figure 3:
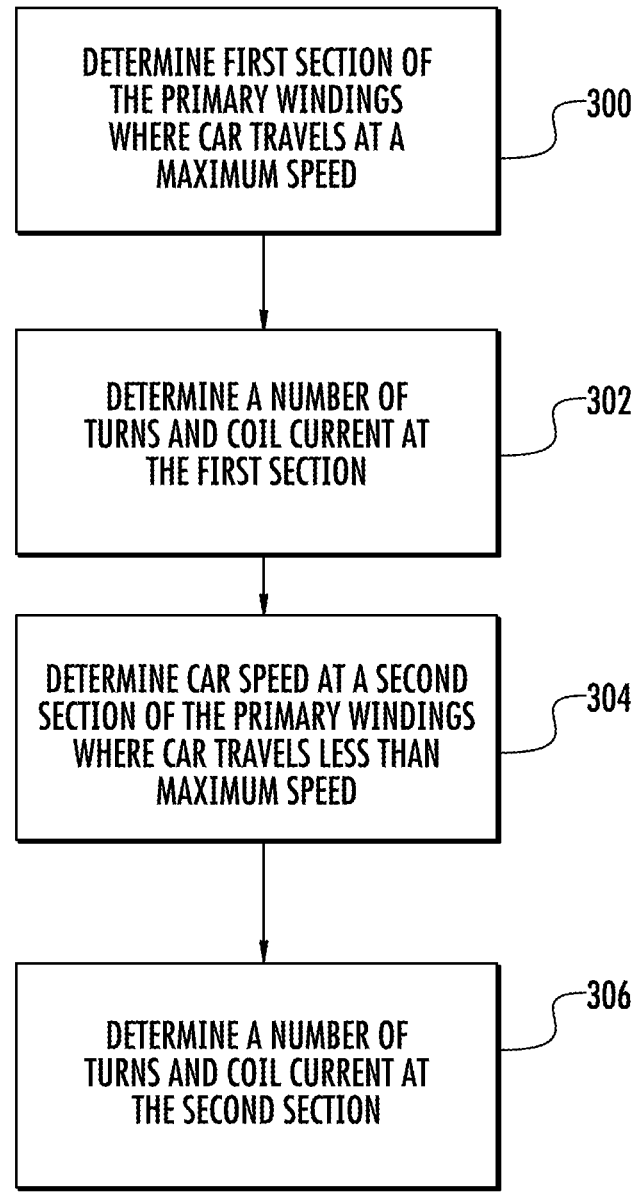
FIG. 3 is a flowchart of a process assigning coil current and number of turns for sections of the primary windings.

FIG. 3 is a flowchart of a process for establishing the number of turns of the coils of the primary windings and the coil current for each section of the primary windings. The process begins at 300 where a first section of the primary windings at which the car travels at a maximum velocity is determined. As shown in FIG. 2, for example, floor 17 is a first section of the primary windings at which the car travels at a first, maximum velocity. At 302, a number of turns and coil current is determined for the first section of the primary windings. At 304 a second section of the primary windings at which the car travels at a second velocity, less than the first, maximum velocity is determined. At 306, a number of turns and coil current is determined for the second section of the primary windings. The number of turns for the second section is greater than the number of turns for the first section. The coil current for the second section is less than the coil current for the first section.

In an exemplary embodiment, the coil current is selected as a function of the expected car velocity. For example, if the expected car velocity is 65% of the maximum car velocity, then the coil current is 0.65 times the current, I, used at the maximum car velocity. The number of turns is 1.54 times the turns, N, used at the maximum car velocity. The coil current is proportional to the expected car velocity and the number of turns is inversely proportional to the expected car velocity and the coil current.

The exemplary embodiments described above relate to self-propelled elevator systems. It is understood that embodiments may be applied to propulsion systems outside of the field of elevator systems, such as walkways, trains, conveyors, etc. In such systems, the primary windings provide force to a traveling component fitted with permanent magnets.

Embodiments provide several advantages. Since the coil current used in certain sections of the primary windings is reduced, power electronics, such as inverters having a lower inverter current ratings, may be used for these sections, which results in lower cost. Further, since the power electronics serve certain sections of the primary windings, the power electronics will operate close to their rated capacity, resulting in higher efficiency.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments and that various aspects of the invention, although described in conjunction with one exemplary embodiment may be used or adapted for use with other embodiments even if not expressly stated. Accordingly, the invention is not to be seen as being limited by the foregoing description, but is only limited by the scope of the appended claims.

The invention claimed is:

1. An elevator system comprising:
   a hoistway;
   an elevator car to travel in the hoistway;
   permanent magnets mounted to the elevator car; and
   primary windings mounted in the hoistway, the primary windings having a first section having a first number of turns and a second section having a second number of turns, wherein the first number of turns is less than the second number of turns;
   wherein the first section is driven by a first coil current and the second section is driven by a second coil current, the first coil current being greater than the second coil current;
   the first number of turns multiplied by the first coil current is substantially equal to the second number of turns multiplied by the second coil current.

2. The elevator system of claim 1 wherein:
   the elevator car travels in the first section at a first velocity and the elevator car travels in the second section at a second velocity, the first velocity being greater than the second velocity.

3. The elevator system of claim 1 wherein:
   the first section corresponds to one floor of the hoistway.

4. The elevator system of claim 1 wherein:
the first section corresponds to multiple floors of the hoistway.

5. The elevator system of claim 1 wherein:
the first section corresponds to less than one floor of the hoistway.

6. The elevator system of claim 1 further comprising:
first power electronics providing first coil current to the first section; and
second power electronics providing second coil current to the second section.

7. The elevator system of claim 6 wherein:
the second power electronics have a lower current rating than the first power electronics.

* * * * *